United States Patent [19]
Doi et al.

[11] Patent Number: 5,808,620
[45] Date of Patent: Sep. 15, 1998

[54] SYSTEM AND METHOD FOR DISPLAYING SHADOWS BY DIVIDING SURFACES BY OCCLUSION INTO UMBRA PENUMBRA, AND ILLUMINATED REGIONS FROM DISCONTINUITY EDGES AND GENERATING MESH

[75] Inventors: Akio Doi, Machida; Takayuki Ito, Sagamihara; Kenji Shimada, Yokohama, all of Japan

[73] Assignee: IBM Corporation, Armonk, N.Y.

[21] Appl. No.: 527,316

[22] Filed: Sep. 12, 1995

[30] Foreign Application Priority Data

Sep. 16, 1994 [JP] Japan .................................. 6-221761

[51] Int. Cl.$^6$ .................................................. G06F 15/20
[52] U.S. Cl. ................................................................ 345/426
[58] Field of Search ............................... 395/119–131; 345/426

[56] References Cited

U.S. PATENT DOCUMENTS 5,175,806  12/1992  Muskovitz et al. ..................... 395/125
5,555,352   9/1996  Lucas .................................... 395/123
5,572,235  11/1996  Mical et al. ............................ 345/150

OTHER PUBLICATIONS

Drettakis et al., A Fast Shadow Algorithm for Area Light Sources Using Backprojection, Computer Graphics, pp. 223–230, Aug. 1994.

Stewart et al., Fast Computation of Shadow Boundaries Using Spatial Coherence and Backprojection, Computer Graphics, pp. 231–238.

Thiron, Realistic 3D Simulation of Shapes and Shadows for Image Processing, Graphical Models and Image Processing, pp. 82–90, Jan. 1992.

*Primary Examiner*—Anton Fetting
*Attorney, Agent, or Firm*—Perman & Green, LLP

[57] ABSTRACT

Shadow images, which are formed on a light-receiving surface by occluding light emitted from a light source with at least one occluding surface, are drawn by the generating data representative of brightness discontinuity edges that partition the light-receiving surface into loop areas that are completely occluded by the occluding surface and loop areas that are partially or totally irradiated by the light source. An irradiation state is assigned to each loop area. The loop areas are then divided into meshes according to the irradiation state assigned to the loop area. Pixel data is generated for each element of the mesh and output for display on a display device.

15 Claims, 16 Drawing Sheets

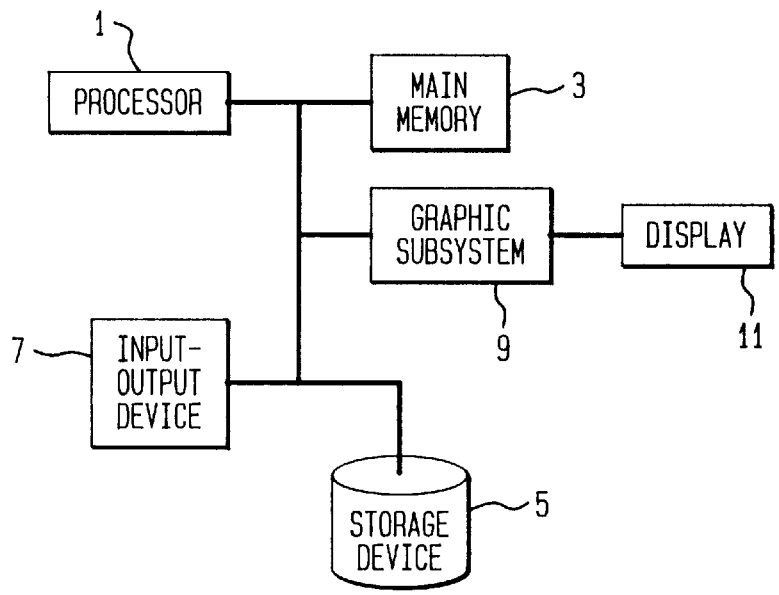
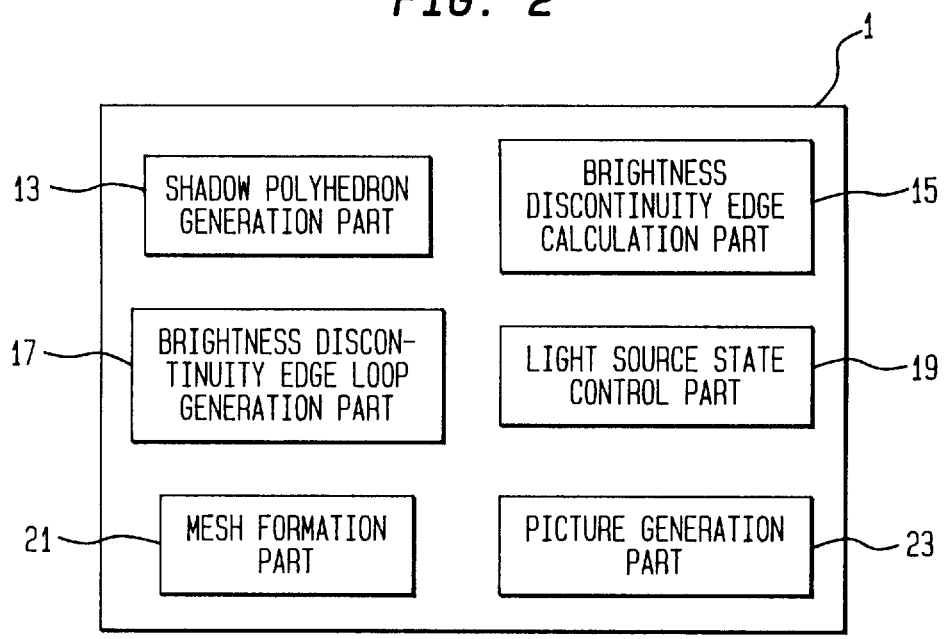

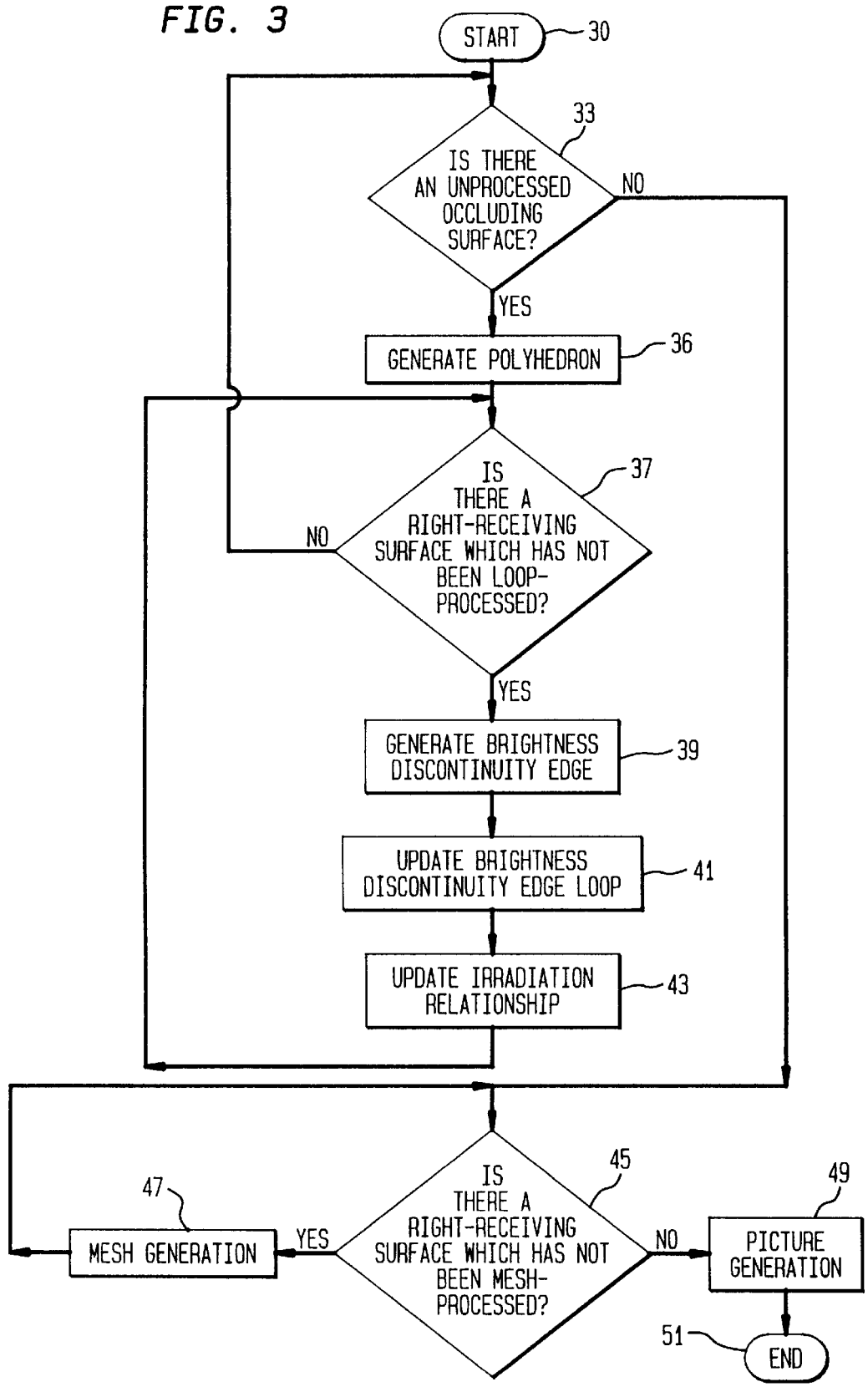

FIG. 11A

| | x | y | z |
|---|---|---|---|
| $V_0$ | | | |
| $V_1$ | | | |
| $V_2$ | | | |
| $V_3$ | | | |
| . | | | |
| . | | | |
| . | | | |
| $V_n$ | | | |

FIG. 11B

| | START POINT | END POINT | CLOCK WISE | COUNTER CLOCK WISE |
|---|---|---|---|---|
| $LS_0$ | $V_0$ | $V_1$ | ✓ | |
| $LS_1$ | $V_1$ | $V_2$ | ✓ | |
| $LS_2$ | $V_2$ | $V_3$ | ✓ | |
| $LS_n$ | $V_0$ | $V_n$ | | ✓ |

FIG. 12

| LOOP | STATE VARIABLE |
|---|---|
| $\ell_1$ | 1 |
| $\ell_2$ | 1 |
| $\ell_3$ | 2 |
| $\ell_4$ | 2 |
| $\ell_5$ | 3 |
| $\ell_6$ | 1 |
| $\ell_7$ | 1 |

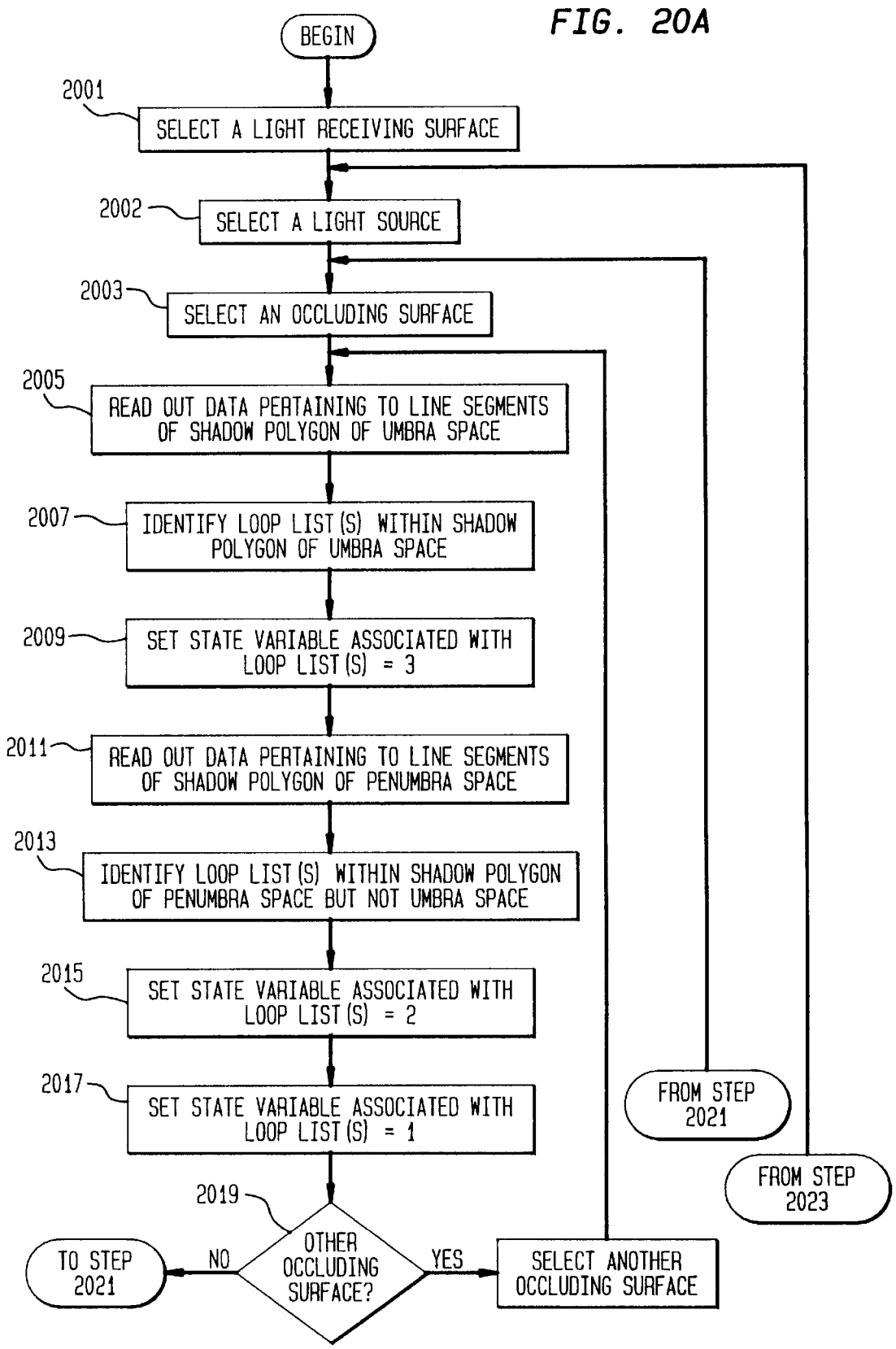

SYSTEM AND METHOD FOR DISPLAYING SHADOWS BY DIVIDING SURFACES BY OCCLUSION INTO UMBRA PENUMBRA, AND ILLUMINATED REGIONS FROM DISCONTINUITY EDGES AND GENERATING MESH

BACKGROUND OF THE INVENTION

1. Technical Field

The present invention relates to a computer graphics, and more particularly to the shadow processing in three-dimensional computer graphics.

2. Description of the Related Art

It is important in the computer graphics to display shadows to generate a more realistic picture. The reality will be increased if the shadow is expressed more realistically by both an umbra space which is representation of space wherein light beams are completely occluded and a penumbra space which is representation of space wherein some of light beams are radiated.

One method to generate shadows is a radiosity method. The radiosity method is an algorithmic method of obtaining a radiated illuminance field in which inter-reflection at a diffusion surface is taken into consideration, based on heat transfer principles. The radiosity is the energy per hour and per area as a light-receiving surface irradiates the light received directly from a source of light and the light received indirectly due to inter-reflection. In the radiosity method, the light-receiving surface is divided into meshes for calculation. This mesh division is very important from the standpoint of an amount of calculation, a capacity of storage, and the quality of the picture. If the number of meshes is increased, the amount of calculation and the amount of data will be increased. If the number of meshes is decreased, a reduction in the picture quality cannot be avoided.

In addition, a progressive refinement radiosity method has been proposed. The progressive refinement radiosity method is an adaptive meshing algorithm that dynamically redivides those meshes in which a change in brightness exceeds a predetermined threshold. More details of this method may be found in (1) M. F. Cohen, S. E. Chen, J. R. Wallen, and D. P. Greenberg, "A Progressive Refinement Approach for Realistic Image Synthesis," Computer Graphics, Vol. 22, No. 4, pp 75–84, 1988, (2) A. T. Campbell III and D. Fussell, "Adaptive Mesh Generation for Global Diffuse Illumination," Computer Graphics, Vol. 24, No. 4, pp 155–164, 1990, and (3) D. R. Baum, S. Mann, P. S. Kevin, and J. M. Winget, "Making Radiosity Usable: Automatic Preprocessing and Meshing Techniques for the Generation of Accurate Radiosity Solutions," Computer Graphics, Vol. 25, No. 4, pp 51–69, 1990. The progressive refinement radiosity method, however, has the following drawbacks. (1) It is difficult to specify a difference in values of brightness or a minimum mesh width which are threshold values of the mesh division; thus, users are required to use trial and error to determine such threshold values. (2) Because the number of meshes to be generated cannot be predicted accurately, a large amount of memory must be reserved. (3) Since information on a light source is not available for each area, it is necessary to calculate brightness each time division is performed. (4) Each time the magnitude of a mesh is changed, a sampling error occurs that results in a large defect on the display. (5) Shadow leaks and light leaks cannot be prevented. (6) In the case of a point light source or a light source whose area is very small, a great number of meshes will be required.

To solve the above problems, there has been proposed a method of calculating boundary edges which indicates brightness on a light-receiving surface using brightness discontinuity edges, and which clearly expresses the discontinuous brightness distribution of the light-receiving surface by generating meshes along the brightness discontinuity edges. A more detailed description of this method may be found in D. Linschinski, F. Tampieri, and D. P. Greenberg, "Combining Hierarchical Radiosity and Discontinuity Meshing," Computer Graphics, Vol. 27, No. 3, 1993. The brightness discontinuity edges of a light-receiving surface may be represented by a set of intersecting lines defined by a light source, an occluding surface and a light-receiving surface. More specifically, as shown in FIG. 15, the brightness discontinuity edges of a light-receiving surface may be formed by the intersection of the light-receiving surface and a plane that contains one of the vertices (s1, s2, s3, and s4) of the light source and one of the sides (o1o2, o2o3, o3o4, and o4o1) of the occluding surface, or may be formed by the intersection of the light-receiving surface and a plane that contains one of the vertices (o1, o2, o3, and o4) of the occluding surface and one of the sides (s1s2, s2s3, s3s4, and s1s4) of the light source. If the brightness discontinuity edges are formed in this manner, the discontinuous brightness distribution of the light-receiving surface can determined with certainty and utilized for mesh division. However, a BSP (binary space partition) tree structure as shown in FIG. 16 is commonly used as a data structure for storing representations of the brightness discontinuity edges. More specifically, the BSP tree method divides a light-receiving surface into two parts each time a brightness discontinuity edge is encountered. This results is a large amount of data being generated. Moreover, when using this method, unnatural shadows occur when rendering long, slender shapes. Furthermore, such errors occur more frequently when rendering is performed using linear color interpolation.

Accordingly, an object of the present invention is to solve the above-described drawbacks, and to provide a more efficient radiosity method of mesh generation for the radiosity method efficient, thereby increasing the speed of the rendering of the radiosity method.

Another object of the present invention is to decrease the amount of data generated by the radiosity method of mesh generation.

SUMMARY OF THE INVENTION

The present invention, which is capable of achieving the objects described above and is for use in a three-dimensional computer graphic system with a display device, is a method for drawing shadow images onto a light-receiving surface by occluding light emitted from at least one light source with at least one occluding surface, the method comprising the steps of:

(a) generating data representative of brightness discontinuity edges within a first part of the light-receiving surface in which the light source is completely occluded by the occluding surface, and generating data representative of brightness discontinuity edges within a second part of the light-receiving surface in which the light source is at least partially irradiated;

(b) dividing the light-receiving surface into loop areas defined by segments constituting the brightness discontinuity edges;

(c) determining and storing an irradiation state for each loop area;

(d) generating a mesh corresponding to each loop area according to said irradiation state associated with the loop area, wherein the mesh comprises a plurality of elements, calculating a brightness value of each element of the mesh according to the irradiation state associated with the loop area, and generating pixel data corresponding to each element of the mesh for display on the display device.

By storing an irradiation state for each loop area with respect to the light source, the amount of data and amount of calculation required for the mesh generation and brightness calculation is reduced.

Preferably, the irradiation state represents one of an umbra space, an penumbra space, and irradiated space defined by the light source and the occluding surface. Thus, the irradiation state can be represented by two bits, which reduces the amount of data required required for the mesh generation and brightness calculation.

The above-described objects can also be achieved by a three-dimensional computer graphic system for executing the above-described steps.

BRIEF DESCRIPTION OF THE DRAWINGS

FIG. 1 is a block diagram of the entire constitution of the present invention;

FIG. 2 is a block diagram of the processor 1 of the present invention;

FIG. 3 is a flow chart of the high level of the present invention;

FIG. 11(A)–(B) are a diagram used to explain a method of forming a brightness discontinuity edge loop;

FIG. 12 illustrates a table for storing an irradiation state variable for the loop area of a light receiving surface;

FIGS. 20(A)–(B) are a flow chart illustrating operation of the light source state control part in assigning an irradiation state to each loop list(s) of a given light receiving surface.

DETAILED DESCRIPTION OF THE EMBODIMENTS OF THE PRESENT INVENTION

Figure 4:
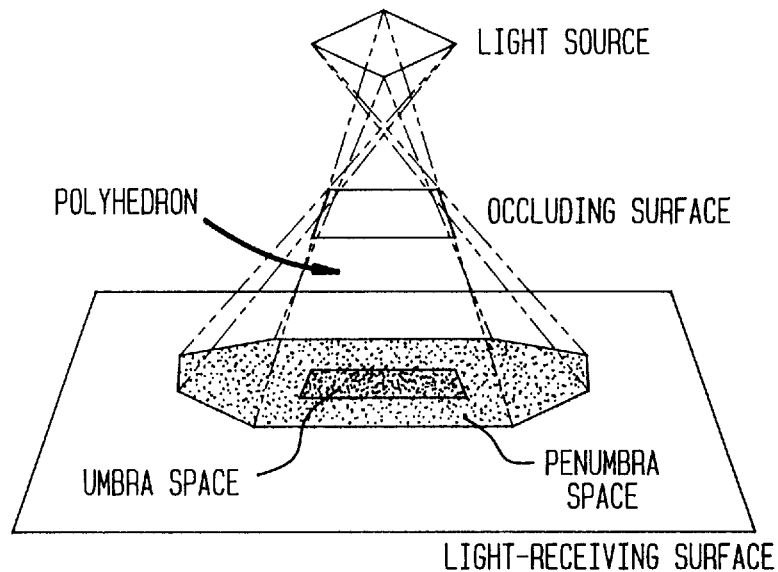
FIG. 4 is a diagram showing an example of a shadow polyhedron.

FIG. 1 shows a computer graphic system that embodies the present invention. A processor 1 is connected to a main memory 3 and makes a calculation by using the programs and data stored in the main memory 3. An input-output device 7 includes a keyboard, a mouse, a printer, etc., inputs the command and data with respect to the processor 1, and outputs necessary data. A storage device 5 is a hard-disk device for storing data to be loaded into the main memory 3. As data, there have also been stored information on the location of a light source, an occluding surface, a light-receiving surface, etc., and information on the irradiation of a light source. To this system there is connected a graphic subsystem 9 for drawing a picture on a display 11 at high speed, and the graphic subsystem 9 draws a picture on the display 11 in cooperation with the processor 1 and the programs and data loaded in the main memory 3.

As shown in FIG. 2, according to the present invention, a shadow polyhedron generation part 13, a brightness discontinuity edge calculation part 15, a brightness discontinuity edge loop formation part 17, a light source state control part 19, a mesh formation part 21, and a picture generation part 23 are implemented by the processor 1. However, the invention is not limited in this respect and may be implemented as part of the graphics subsystem 9 or as part of a coprocessor interfaced to the processor 1.

The general operation of the shadow polyhedron generation part 13, brightness discontinuity edge calculation part 15, brightness discontinuity edge loop formation part 17, light source state control part 19, mesh formation part 21, and picture generation part 23 is shown in FIG. 3. First, in steps 33–35, the shadow polygon generation part 13 generates at least one shadow polygon for each occluding surface associated with a display picture. The shadow polygons will be described later. For each shadow polygon generated in step 35, each light-receiving surface is processed according to steps 39–43. In step 39, the brightness discontinuity edge calculation part 15 calculates the brightness discontinuity edges, if any, associated with the particular light-receiving surface and the particular shadow polygon. In step 41, if a brightness discontinuity edge is calculated in step 39, the brightness discontinuity edge loop formation part 17 divides the light-receiving surface into portions and stores a representation of such portions in the memory 3. Preferably, the brightness discontinuity edge loop formation part 17 divides the light-receiving surface into portions after all the brightness discontinuity edges are generated for the particular light-receiving surface in step 39. In step 43, for each portion of the light-receiving surface defined in step 41, the light source state control part 19 determines whether a light beam from a light source has been irradiated for each portion, or whether an irradiation relation (irradiation state) such as an umbra or a penumbra is confirmed by the brightness discontinuity edge loop formation part 17.

After all the shadow polygons have completed processing, operation continues to step 47 wherein the mesh generation part 21 divides each portion of the light-receiving surfaces defined in step 41 into meshes. Finally, in step 49, the picture generation part 23 performs the calculations required for generating a picture on each element of the meshes generated in step 47.

Note that for simplification, the light sources, occluding surfaces, and light-receiving surfaces may be represented by a convex polygon. For this reason, FIG. 3 assumes that the light sources, occluding surfaces, and light receiving surfaces have been divided in a preprocessing step into convex polygons.

The shadow polygon generation part 13 of the present invention generates at least one shadow polygon for each occluding surface associated with a display picture. When the light source and the occluding surface are limited to a convex polygon, as described above, the space between the occluding surface and light-receiving surface in which the light beams are occluded will be a polyhedron. This polyhedron is referred to as the shadow polyhedron, and typically is defined by a polyhedron representative of penumbra space and a polyhedron representative of umbra space. FIG. 4 illustrates the polyhedron representative of penumbra space by broken lines. A plurality of brightness discontinuity edges are associated with the shadow polyhedron. However, the brightness discontinuity edges defined by the intersection of the shadow polyhedron and the light-receiving surface are most important. More specifically, the intersection of the shadow polyhedron and the light-receiving surface typically defines two shadow polygons, a shadow polygon representative of penumbra space and a shadow polygon representative of umbra space. Preferably, the shadow polygon generation part 13 of the present invention generates a representation of the shadow polygon representative of penumbra space and a representation of the shadow polygon representative of umbra space.

Figure 5:
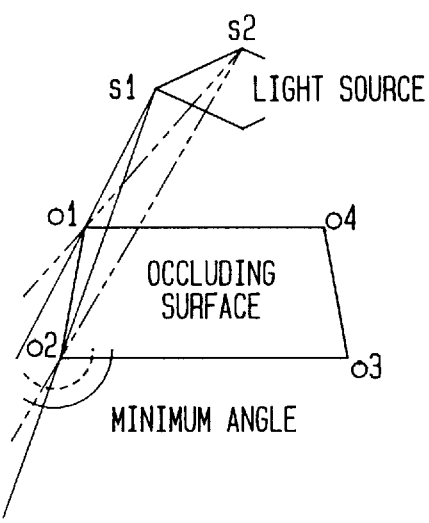
FIG. 5 is a diagram used to explain a formation method of a shadow polyhedron representative an umbra space.
Figure 6:
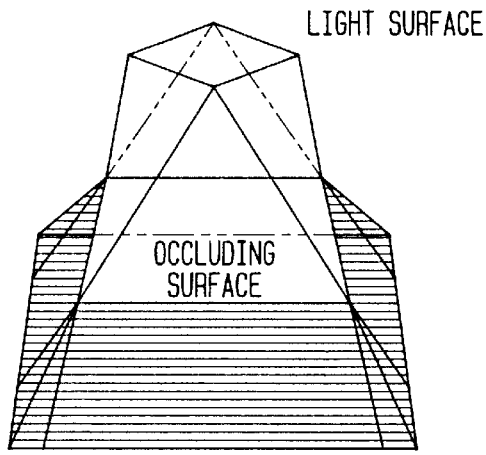
FIG. 6 is a diagram used to explain a formation method of a shadow polyhedron representative an umbra space.

To generate a representation of the shadow polygon representative of umbra space for a given occluding surface and light-receiving surface, the shadow polygon generation part 13 begins by selecting one side of the occluding surface and, for each vertex of the light source, generating data representing a plane that contains the selected side of the occluding surface and the particular vertex of the light source. For example, as shown in FIG. 5, the shadow polygon generation part 13 may select the side o1o2 of the occluding surface; then, for each vertex S1,S2... of the light source, the shadow polygon generation part 13 generates data representing the plane containing the selected side o1o2 and the particular vertex. The shadow polygon generation part 13 then selects the plane whose angle with respect to the occluding surface is a minimum among those planes containing the selected side of the occluding surface and a vertex of the light source. This plane represents one of the surfaces of the shadow polyhedron representative of umbra space. This same operation is performed for each of the sides o2o3, o3o4, and o4o1 of the occluding surface. The resultant data defines the shadow polyhedron representative of umbra space. The square pillar of FIG. 6 illustrates an example of the shadow polyhedron representative of umbra space determined by the polygon generation part 13. The polygon generation part 13 then determines the light segments wherein the shadow polyhedron representative of umbra space intersects the light-receiving surface. These line segments define the shadow polygon representative of umbra space.

Preferably, the polygon generation part 13 represents the line segments that define the shadow polygon representative of umbra space as data stored in two tables as shown in FIG. 11(A) and (B). One of the tables, as shown in FIG. 11(A), stores entries each identifying coordinates (x,y,z) of a particular vertex which comprises a start point or end point of a line segment. The particular vertex to which each entry corresponds may be identified by the position of the entry in the table or by a tag associated with the entry. The other table, as shown in FIG. 11(B), stores entries each identifying the vertices of a particular line segment. The particular line segment to which each entry corresponds may be identified by the position of the entry in the table or by a tag associated with the entry.

Figure 7:
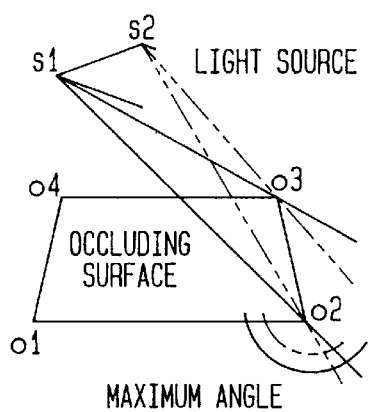
FIG. 7 is a diagram used to explain a formation method of a shadow polyhedron representative a penumbra space.
Figure 8:
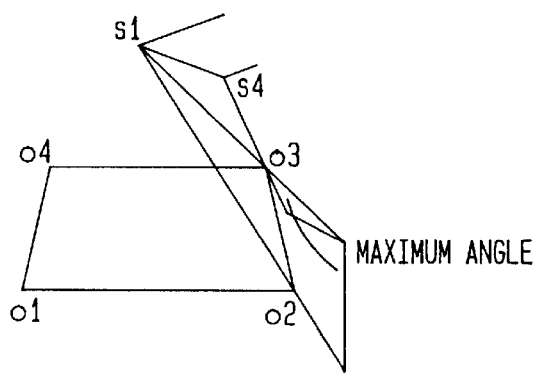
FIG. 8 is a diagram used to explain a formation method of a shadow polyhedron representative a penumbra space.
Figure 17:
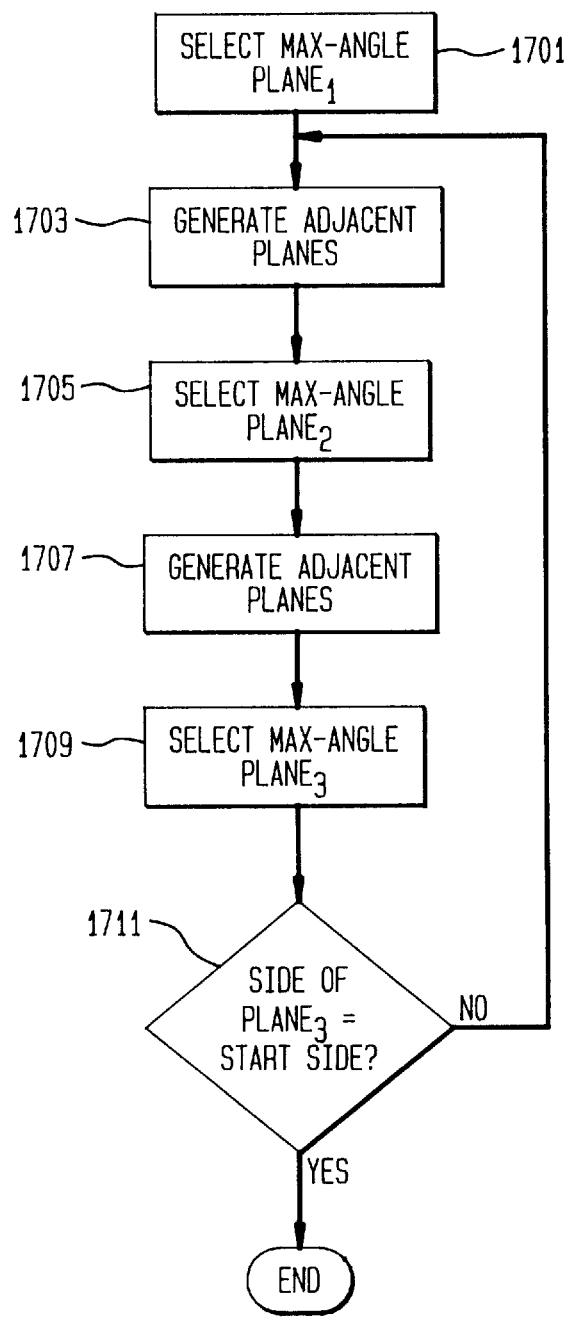
FIG. 17 is a flow chart illustrating operation of the polygon generation part in generating the shadow polyhedron of penumbra space for a given light source and occluding surface.

To generate a representation of the shadow polygon representative of penumbra space for a given occluding surface and light-receiving surface, the shadow polygon generation part 13 follows the operation illustrated in FIG. 17. In step 1701, the shadow polygon generation part 13 begins by selecting one side (i.e., the start side) of the occluding surface and, for each vertex of the light source, generating data representing a plane that contains the start side of the occluding surface and the particular vertex of the light source. For example, as shown in FIG. 7, the shadow polygon generation part 13 may select side o2o3 of the occluding surface as the start side, and then, for each vertex S1,S2... of the light source, generate data representing the plane containing the start side o2o3 and the particular vertex of the light source. The shadow polygon generation part 13 then selects the plane whose angle with respect to the occluding surface is a maximum among those planes containing the start side of the occluding surface and a vertex of the light source. For example, as shown in FIG. 8, the selected plane includes the vertex S1 of the light source and the start side o2o3 of the occluding surface. This selected plane represents one of the surfaces of the shadow polyhedron representative of penumbra space.

In step 1703, the polygon generation part 13 identifies the vertices of the light source that are not part of the plane selected in step 1701 (in the example S2,S3,S4), and then, for each identified vertex, generates data representing a plane that contains:

a first side defined by connecting the particular vertex to one of the vertices of the start side of the occluding surface; and a second side shared by the plane selected in step 1701. For example, data representing three planes may be generated in step 1703 including a first plane that includes vertices S4 and S1 of the light source and vertex o3 the occluding surface, a second plane that includes vertices S3 and S1 of the light source and vertex o3 of the occluding surface, and a third plane that includes vertices S2 and S1 of the light source and vertex o3 of the occluding surface.

In step 1705, the polygon generation part 13 selects the plane whose angle with respect to the plane selected in step 1701 is a maximum among those planes generated in step 1703. For example, as shown in FIG. 7, the selected plane includes the vertices S1 and S4 of the light source and the vertex o3 of the occluding surface. This selected plane represents one of the surfaces of the shadow polyhedron representative of penumbra space.

In step 1707, the polygon generation part 13 identifies a side of the occluding surface adjacent to the start side, and for each vertex of the light source of the plane selected in step 1705, generates data representing a plane that includes the adjacent side and the vertex. For example, the adjacent side may be side o3o4 of the occluding surface and the plane selected in step 1705 includes the vertices S1 and S4 of the light source. In this case, the polygon generation part 13 in step 1707 generates data representing two planes: a first plane that includes side o3o4 and vertex S1 and a second plane that includes side o3o4 and vertex S4.

In step 1709, the polygon generation part 13 then selects the plane whose angle with respect to the occluding surface is a maximum among those planes generated in step 1707. In the example as shown in FIG. 8, the plane including side o304 and vertex S4 is selected. This selected plane represents one of the surfaces of the shadow polyhedron representative of penumbra space.

In step 1711, the polygon generation part 13 determines if the adjacent side identified in step 1707 is the start side selected in step 1701. If so, the operation ends; otherwise operation returns back to step 1703 wherein the plane selected in step 1709 is substituted for the plane selected in step 1701.

Figure 9:
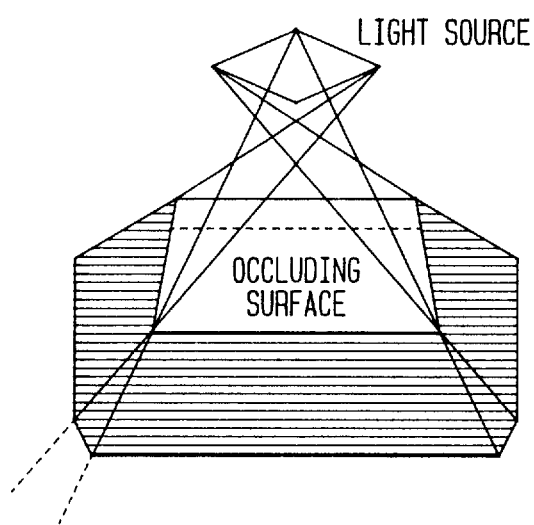
FIG. 9 is a diagram used to explain a formation method of a shadow polyhedron representative a penumbra space.

The selected planes as described above define the shadow polyhedron representative of penumbra space. The square pillar of FIG. 9 illustrates an example of the shadow polyhedron representative of penumbra space determined by the polygon generation part 13. The polygon generation part 13 then determines the line segments wherein the shadow polyhedron representative of penumbra space intersects the light-receiving surface. These line segments define the shadow polygon representative of penumbra space. Preferably, the polygon generation part 13 represents the line segments that define the shadow polygon representative of penumbra space as data stored in the two tables as shown in FIG. 11(A) and (B) as described above.

Note that, if the number of sides of a light source is given as N1 and the number of the sides of an occluding surface is given as N2, the number of brightness critical surfaces generated by the conventional systems is 2*N1*N2, while the number of brightness critical surfaces generated by the system and method as described above is N1+2*N2. Thus, it is clear that the system and method for generating the brightness critical surfaces described above effectively decreases the amount of processing and amount of data required by the conventional techniques. Additional information pertaining to the generation of the brightness critical surfaces using a shadow polyhedron is disclosed in N. Chin, and S. Feiner, "Near Real-Time Shadow Generation Using BPS Trees,"Computer Graphics, Vol. 23, No. 3, pp. 99–106, 1989, hereinafter incorporated by reference in its entirety.

The line segments defining the shadow polygon representative of penumbra space and the shadow polygon representative of umbra space as described above represent brightness discontinuity edges. According to the present invention, adjoining lines segments are grouped into loops having characteristic direction. Preferably, the loops may have either a clockwise direction (as viewed from above) or counter-clockwise direction. Loops having a clockwise direction define a "hole" circumscribed by the loop, and loops having a counter-clockwise direction define an "outside area" that is outside the "hole" circumscribed by the loop. However, this convention may be reversed in which case loops having a counter-clockwise direction define a "hole", and loops having a clockwise direction define an "outside area".

Figure 18A:
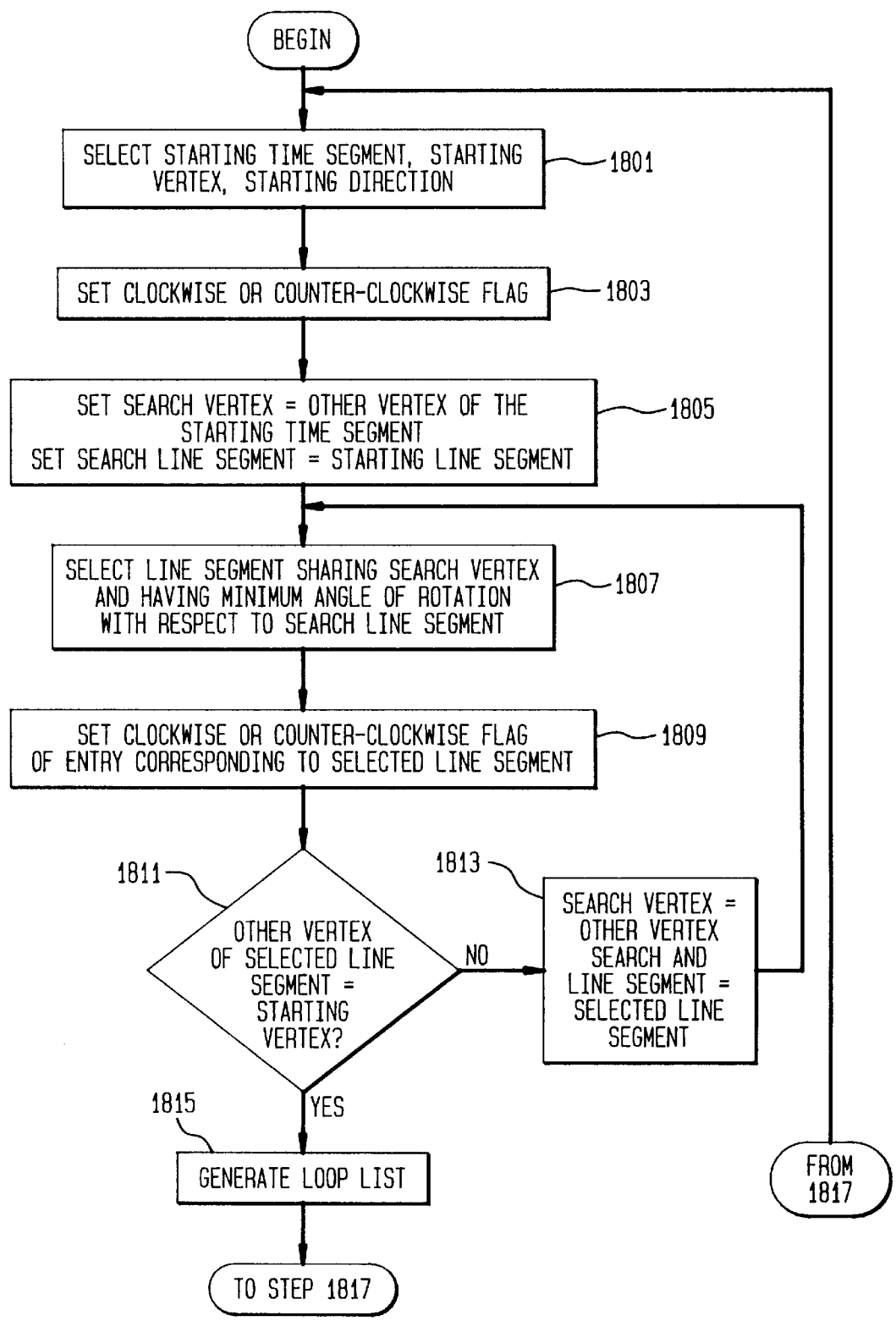
FIGS. 18(A)–(B) are a flow chart illustrating operation of the discontinuity edge loop generation part in generating the loop list(s) for a given light receiving surface.
Figure 18B:
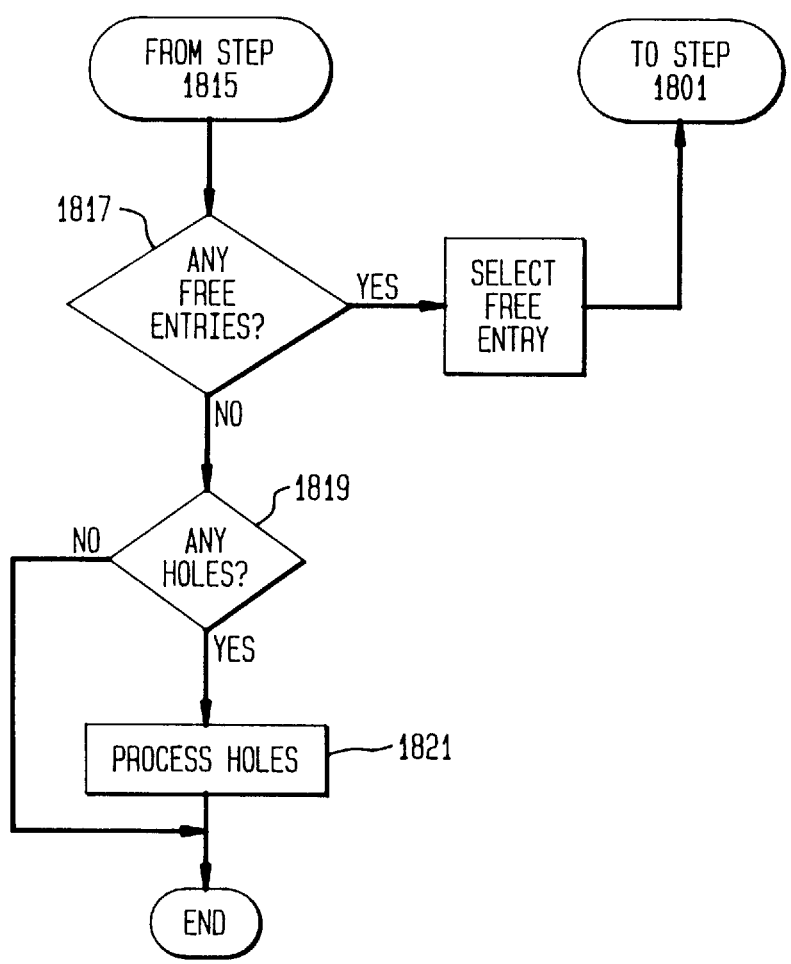

As shown in FIG. 11(B), each entry of the table identifying the vertices of the line segments include a clockwise flag and a counter-clockwise flag. The clockwise flag and the counter-clockwise flag of the entries stored in the table are utilized by the brightness discontinuity edge loop generation part 17 to traverse the light-receiving surface along the brightness discontinuity edges. More particularly, as shown in FIGS. 18(A) and (B), the brightness discontinuity edge loop generation part 17 begins operation in step 1801 by identifying a starting line segment, starting vertex, and starting direction (either clockwise or counter-clockwise).

Preferably, the starting line segment is identified by locating an entry in the table of FIG. 11(B) whose clockwise flag or counter-clockwise flag is not set. The starting direction is set to clockwise if only the counter-clockwise flag of the starting entry is set, to counter-clockwise if only the clockwise flag of the starting entry is set, or to either clockwise or counterclockwise if both the clockwise flag and counter-clockwise flag of the starting entry is not set. In addition, one of the vertices of the starting line segment is stored in memory as a starting vertex. If the starting direction is clockwise, the starting vertex corresponds to the left-most vertex (as viewed from above) of the starting line segment. If the starting direction is counter-clockwise, the starting vertex corresponds to the right-most vertex (as viewed from above) of the starting line segment.

Figure 19:
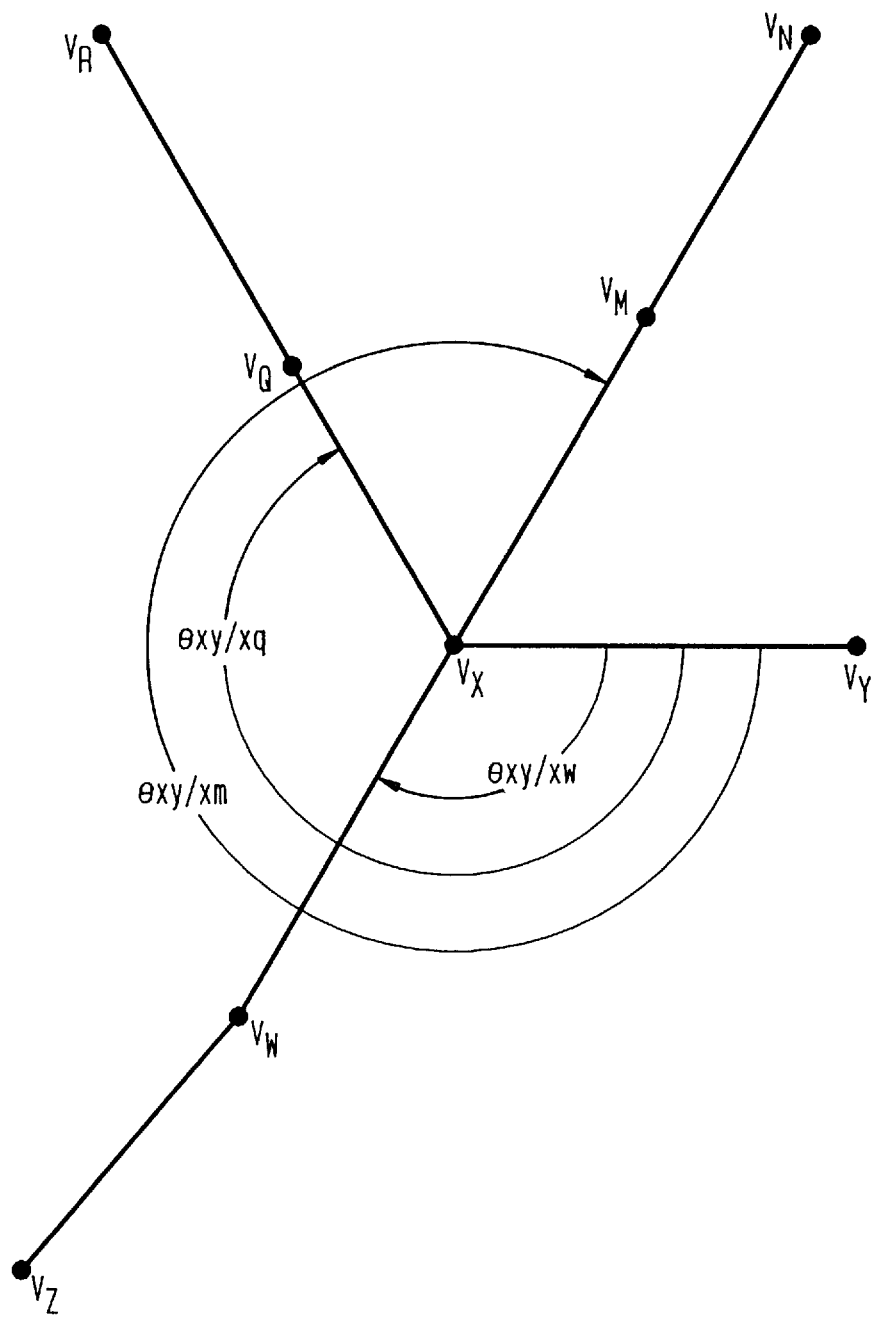
FIG. 19 is a pictorial representation of the angle of rotation of adjacent line segments determined by the discontinuity edge loop generation part as illustrated in FIGS. 18(A)–(B)

In step 1803, discontinuity edge loop generation part 17 sets either the clockwise flag or the counter-clockwise flag corresponding to the starting direction for the entry of the table of FIG. 11(B) that is associated with the starting line segment. In step 1805, the discontinuity edge loop generation part 17 selects the other vertex (i.e., other than the starting vertex) of the starting line segment as a search vertex, and selects the starting line segment as a search line segment. In step 1807, the discontinuity edge loop generation part 17 traverses the table of line segments to identify those line segments that share the search vertex, and selects, from the identified line segments, the line segment having the minimum clockwise angle of rotation (as viewed from above) with respect to the search line segment. For example, consider the line segments when view from above as shown in FIG. 19. In this example, the line segment defined by vertices Vx and Vy is the starting line segment/search line segment, the starting direction is counter-clockwise, and the starting vertex/search vertex is Vy. The line segments that share the other vertex Vx include: the line segment defined by vertices Vx and Vw, the line segment defined by vertices Vx and Vq, and the line segment defined by vertices Vx and Vm. In this case, the clockwise angle of rotation (as viewed from above) with respect to the starting line segment for these line segments is θxy/xw, θxy/xq, and θxy/xm, respectively, as shown. Because θxy/xw is the minimum of these angles, the discontinuity edge loop generation part 17 selects the line segment defined by the vertices Vx and Vw in step 1807.

Returning to FIGS. 18(A) and (B), in step 1809, the discontinuity edge loop generation part 17 sets either the clockwise flag or the counter-clockwise flag that corresponds to the starting direction for the entry of the table of FIG. 11(B) that is associated with the line segment selected in step 1807. In step 1811, the discontinuity edge loop generation part 17 checks whether the other vertex (i.e., other than the search vertex) of the line segment selected in step 1807 is the starting vertex. If not, operation continues to step 1813 wherein the discontinuity edge loop generation part selects the other vertex (i.e., other than the search vertex) of the line segment selected in step 1807 as the search vertex, selects the line segment selected in step 1807 as the search line segment, and operation continues to step 1807 as described above.

However, if in step 1811 it is determined that the other vertex (i.e., other than the search vertex) of the line segment selected in step 1807 is the starting vertex, in step 1815 the discontinuity edge loop generation part 17 generates a loop list that identifies the starting line segment, the line segment (s) selected in step 1807, and the starting direction of the particular loop traversed in steps 1801 to 1813 and operation continues to step 1817.

In step 1817, the discontinuity edge loop generation part 17 checks the table of FIG. 11(B) to determine if there are any entries whose clockwise flag or counter-clockwise flag is not set. If there is one or more of such entries, operation returns to step 1801 wherein the discontinuity edge loop generation part 17 substitutes the line segment identified by one of such entries as the starting line segment.

However, if there are no such entries, in step 1819 the discontinuity edge loop generation part 17 checks for holes. More specifically, the discontinuity edge loop generation part 17 checks the loop list(s) generated in step 1815 to identify those loop list(s) that share the same line segments absolutely. Such loop lists will have opposite starting directions. Such loop lists identify a hole. If there are no such loop lists, the operation of the discontinuity edge loop generation part 17 ends. However, in step 1821, for the particular loop lists that identify a hole, the discontinuity edge loop generation part 17 identifies a particular loop list that is external to the hole yet circumscribes the hole. The discontinuity edge loop generation part 17 then determines which loop list identified in step 1819 has a starting direction which is opposite to the starting direction of the particular loop list that is external to the hole yet circumscribes the hole, and combines the loop lists such that the loops which share the same starting direction have two entries in the list. The operation of the discontinuity edge loop generation part 17 then ends.

Figure 10A:
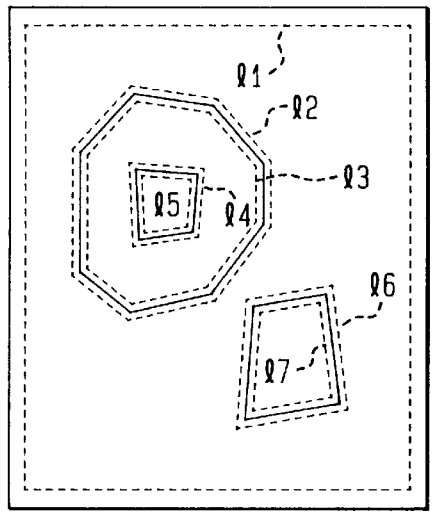
FIG. 10(A)–(D) are a diagram used to explain a method of forming a brightness discontinuity edge loop.
Figure 10B:
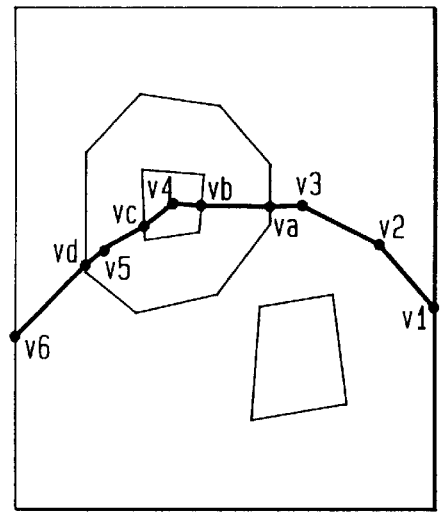

A concrete example of the operation of the discontinuity edge loop generation part 17 is illustrated in FIGS. 10(A)–(D). As shown in FIG. 10(A), a light-receiving surface 1000 has been traversed by the discontinuity edge loop generation part 17 to generate loop lists corresponding to loops 11 to 17 (indicated by broken lines). Consider a case wherein the brightness discontinuity edge calculation part 15 has generated nine (9) new brightness discontinuity edges, which are represented by the line segments v1v2, v2v3, v3va, vavb, vbv4, v4vc, vcv5, v5vd, and vdv6 as shown in FIG. 10(B) The new line segments are registered in a table of FIG. 11(B). To generate a new loop, one of the new line segments is selected as the starting line segment, and a starting direction and starting vertex is selected. Adjacent line segments are then selected in sequence. For example, if the line segment v1v2 is selected as the starting line segment and the "counter-clockwise" direction is selected as the starting direction, and the adjacent line segments are selected in sequence, the loop will be the loop 11' of FIG. 10(C). In generating the loop 11', the discontinuity edge loop generation part 17 begins and ends with the vertex v1. At the vertex va, the adjacent line segment having a minimum angle of rotation is selected. And, at the vertex vd, the adjacent line segment having a minimum angle of rotation is selected. By this operation, the new line segments v1v2, v2v3, v3va, and vdv6 are traversed in the "counter-clockwise" direction. Therefore, for these line segments, the corresponding counter-clockwise flag in the table of FIG. 11(B) is set.

Figure 10D:
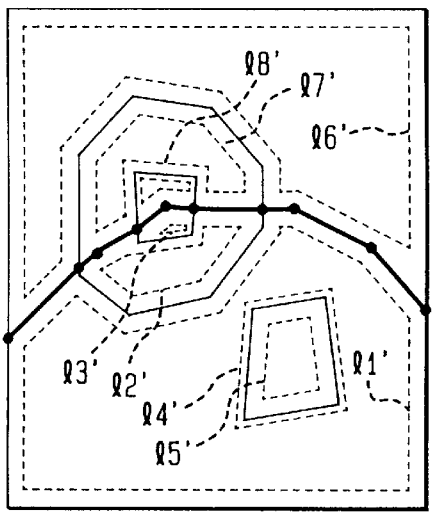
Figure 10C:
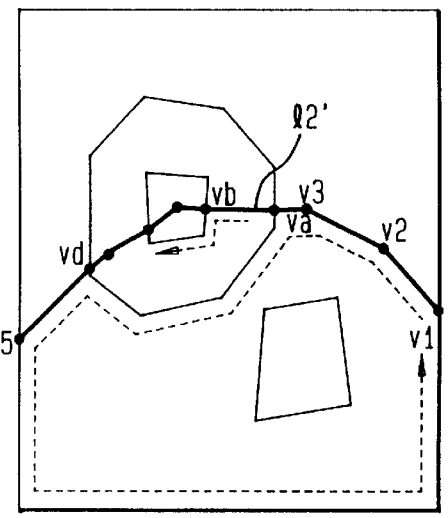

Also shown in FIG. 10(C) is operation of the discontinuity edge loop generation part 17 in generating the loop 12'. If the line segments are traversed as described in FIGS. 18(A) and (B), loop lists will be generated as shown in FIG. 10(D).

Figure 20B:
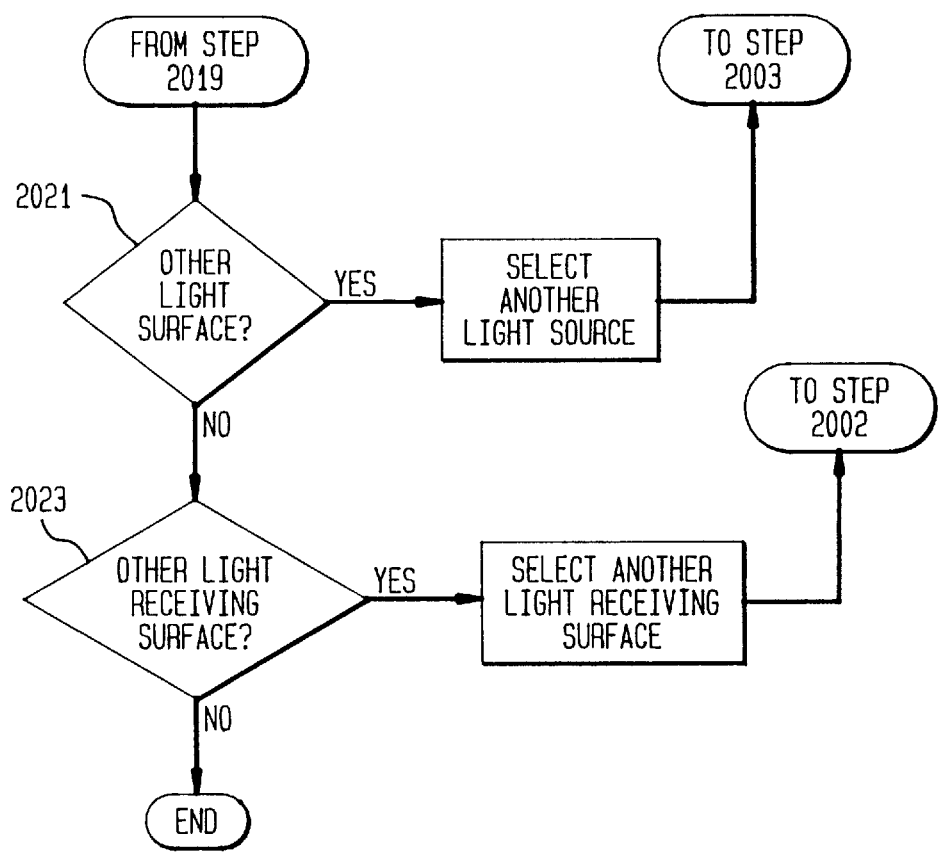

For each light receiving surface, the light source state control part 19 determines and stores an illuminance state pertaining to each light source and occlude surface for the loop list(s) generated by the discontinuity edge loop generation part 17. More specifically, as shown in FIG. 20, the light source state control part 19 begins operation in step 2001 by selecting a light receiving surface. In step 2002, the light source state control part 19 selects a light source. In step 2003 the light state control part 19 selects an occlude surface. In step 2005, the light source state control part 19 reads out the data from the table as shown in FIGS. 11(A) and (B) pertaining to the line segments that define the shadow polygon of umbra space for the selected light receiving surface, light source and occlude surface as determined by the polygon generation part 13 as described above. In step 2007, the light source state control part 19 determines which loop list(s) generated by the discontinuity edge loop generation part 17 as described above are within the shadow polygon of umbra space for the selected light receiving surface, light source and occlude surface. In step 2009, for each loop list determined to be within the shadow polygon of umbra space, the light state control part 19 sets a state variable associated with the selected light receiving surface, the selected light source, the selected occlude surface and the particular loop list to a first predetermined value, for example the integer 3, which indicates that the particular loop list is within the shadow polygon of umbra space.

In step 2011, the light source state control part 19 reads out the data from the table as shown in FIGS. 11(A) and (B) pertaining to the line segments that define the shadow polygon of penumbra space for the selected light receiving surface, light source and occlude surface as determined by the polygon generation part 13 as described above. In step 2013, the light source state control part 19 determines which loop list(s) generated by the discontinuity edge loop generation part 17 as described above are within the shadow polygon of penumbra space for the selected light receiving surface, light source and occlude surface. In step 2015, for each loop list determined to be within the shadow polygon of penumbra space and not previously determined in step 2009 to be within the shadow polygon of umbra space, the light state control part 19 sets a state variable associated with the selected light receiving surface, the selected light source, the selected occlude surface and the particular loop list to a second predetermined value, for example the integer 2, which indicates that the particular loop list is within the shadow polygon of penumbra space.

In step 2017, for each loop list not previously determined in step 2009 to be within the shadow polygon of umbra space and not previously determined in step 2013 to be within the shadow polygon of penumbra space, the light state control part 19 sets a state variable associated with the selected light receiving surface, the selected light source, the selected occlude surface and the particular loop list to a third predetermined value, for example the integer 1, which indicates that the particular loop list is not within the shadow polygon of umbra space and not within the shadow polygon of penumbra space (i.e., in an irradiated state).

In step 2019, the light state control part 19 determines if there is another occlude surface associated with the light source, and if so selects the other occlude surface and operation returns back to step 2005. If not, operation continues to step 2021 wherein the light state control part 19 determines if there is another light source associated with the light source. If so, the light state control part 19 selects the other light source and operation returns back to step 2003. If not, operation continues to step 2023 wherein the light state control part 19 determines if there is another light receiving surface. If so, the light state control part 19 selects the other light receiving surface and operation returns back to step 2002. If not, the operation of the light state control part 19 ends.

The state variables associated with the loop lists of a particular light receiving surface, a selected light source, and a selected occlude surface may be stored in a table, for example as shown in FIG. 12. The table of FIG. 12 may be expanded to include the state variables associated with a plurality of light sources and/or occluding surfaces associated with the particular light receiving surface. Moreover, the table of FIG. 12 may be expanded to include state variables associated with a plurality of light receiving surfaces.

The mesh generation part 21 divides the area defined by each loop into meshes. For example, the meshing techniques disclosed in K. Shimada et al., "Bubble Mesh: Automated Triangular Meshing of Non_manifold Geometry by Sphere Packing", Conference Proceedings of Solid Modeling 1995, May 1995, herein incorporated by reference in its entirety, may be used to divide the area defined by each loop into meshes.

In dividing a particular loop area into meshes, the mesh generation part 21 preferably generates the refers to the state variables associated with the particular loop area. More specifically, because the change in brightness is normally large in a penumbra area, with respect to a loop area whose associated state variables are set to the predetermined second value, the mesh generation part 21 preferably increases the number of elements constituting the mesh of the loop area and reduces the size of each element of the mesh. However, because the change in brightness is normally small in an umbra area or an irradiated area, with respect to a loop area whose associated state variables are set to the predetermined third value or predetermined first value, the mesh generation part 21 preferably reduces the number of elements constituting the mesh of the loop area and increases the size of each element of the mesh.

In addition, it is preferred that the meshes generated by the mesh generation part 21 are consistent between the brightness discontinuity edges and the mesh boundary, and that the mesh shape does not have distortions. The mesh generation technique described in the K. Shimada et al. reference, which is incorporated by reference above, may be used to generate such meshes, using nodes that are located utilizing a dominant equation of a physical phenomenon as a model. These nodes are interconnected with the aid of a Delauney's net to form meshes.

Moreover, it is preferably that the meshes maintain a selectable degree of continuity across brightness discontinuity edges to prohibit shadow leakage and light leakage. To accomplish this, the meshes that include a brightness discontinuity edge are preferably broken down into classes:

(1) D0 class; and
(2) Dn class (where n=1, 2, 3, . . . ).

Figure 13:
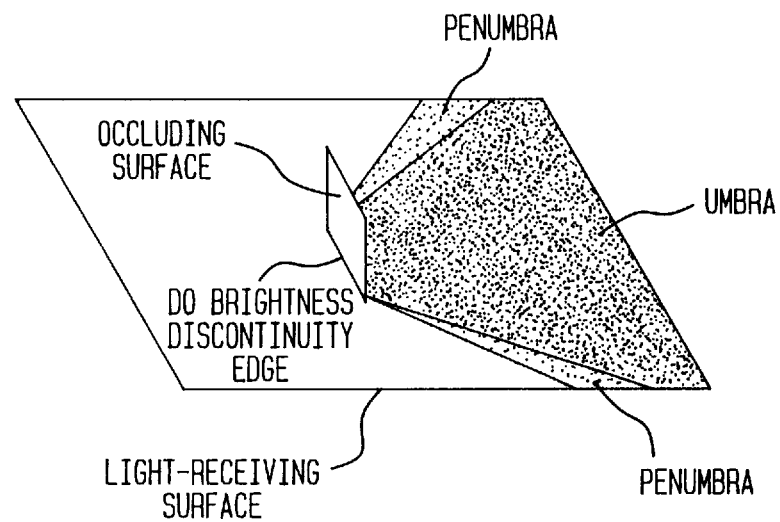
FIG. 13 is a diagram used to explain the brightness discontinuity edge of D0 class.

For the D0 class of meshes, an element of the mesh is not be shared by an adjacent mesh, and thus do not maintain continuity. The D0 class of meshes preferably include those meshes that have a brightness discontinuity edge generated by a point light source and an occluding surface, wherein a side of the occluding surface contacts the light-receiving surface as shown in FIG. 13. For the Dn class of meshes, the number n represents the likelihood that an element of the mesh will not be shared by an adjacent mesh, and thus not maintain continuity.

Figure 14:
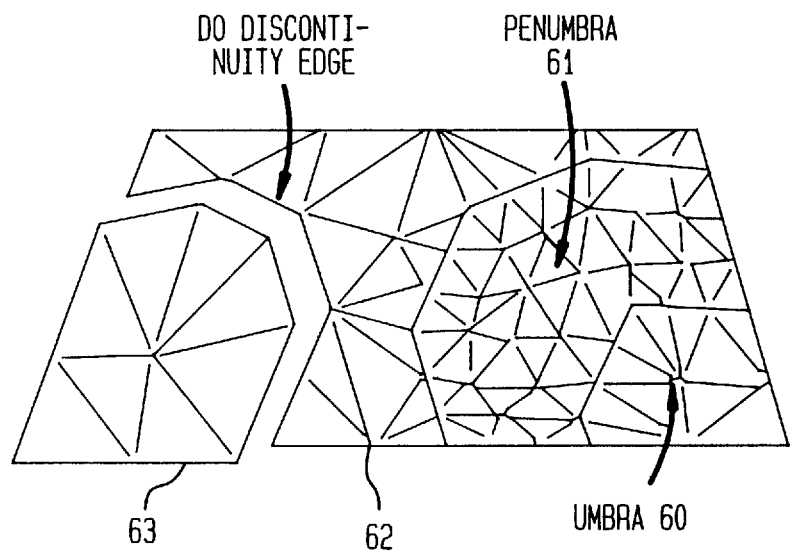
FIG. 14 is a diagram used to explain the brightness discontinuity edges of D0 class and Dn class.
Figure 15:
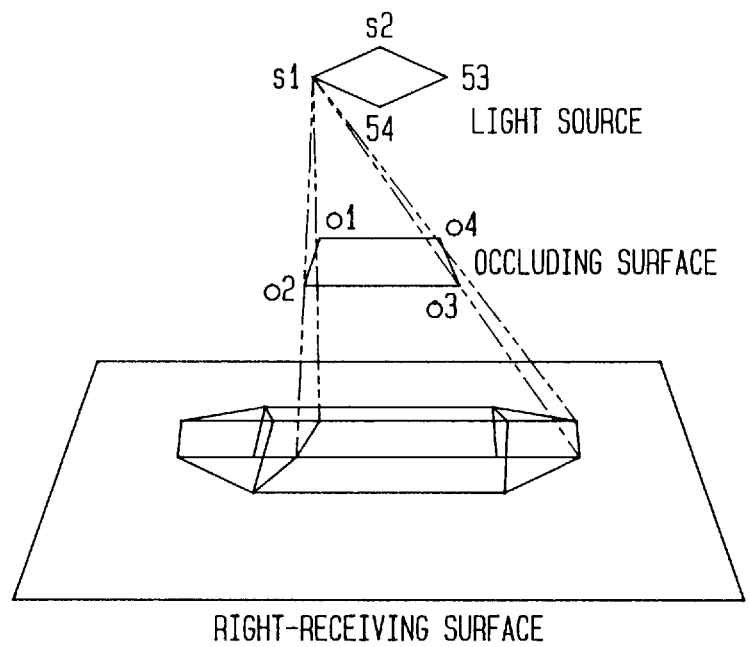
FIG. 15 is a diagram used to explain the brightness critical surface and the brightness discontinuity edge.
Figure 16:
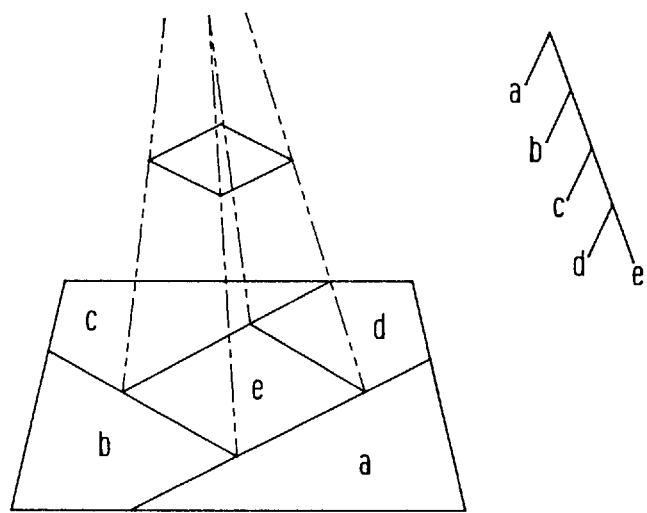
FIG. 16 is a diagram used to explain a conventional method of holding a brightness discontinuity edge.

Therefore, for the brightness discontinuity edge of the D0 class, individual side and vertex are given to the areas on the both sides when a light-receiving surface is divided. For the brightness discontinuity edge of the Dn class, the sides and vertexes of areas on the both sides are shared. In the case of FIG. 14, for example, an umbra 60 and a penumbra 61 are generated by a surface light source, and an area 63 is generated by other point light source. An area 62 is an area where light beams are irradiated by both a surface light source and a point light source. Since the areas 60 through 62 have continuity of brightness, they are divided by the brightness discontinuity edge of the Dn class. However, since the area 63 is an umbra by a point light source, it has no continuity of brightness and is the brightness discontinuity edge of the D0 class, so individual vertex and side are required as shown in FIG. 14.

The picture generation part 23 performs the calculations required for generating pixel data corresponding to the mesh elements generated by the mesh generation part 21. The pixel data generated by the picture generation part 23 is output to the display 11 by the cooperation of the processor 1 and graphic subsystem 9 of FIG. 1. In generating the pixel data, the brightness caused by direct light and the brightness caused by indirect light are obtained separately. However, since the determination of a shadow area by direct light has been completed at the step of grasping and holding of the relationship of irradiation, an area other a penumbra can be easily calculated. The penumbra area generated by a surface light source may be calculated with the use of a conventional light tracing method by point sampling. Also, as an approximate solution, it can be calculated based on only the information of the light source state control part 19.

In the calculation of indirect light, a form factor is calculated for each patch by the radiation from a light source, and the non-radiation radiosity from the patch is radiated. The patch area as a unit of radiation and the element area that receives light are used by triangle-dividing the brightness discontinuity edge loop. A method of calculating indirect light by radiation from a patch can be calculated at high speed, as compared with a method of collecting light. However, since a form factor is calculated by a relative equation, $F_{ij}A_i=F_{ji}A_j$, an error in accuracy tends to occur. For this reason, each element is projected on a hemispheric base, and at the time of preview, the form factor is calculated with the use of the point sampling based on a z buffering method, and in the final generation of a picture, it is calculated with the use of the line sampling based on a scan line unit. This is described in detail in Akio Doi, "Bidirectional Radiosity Approach for Complex Environments," Denshi Tokyo, IEEE Tokyo Section, No. 32, pp. 93–99, 1993.

Since mirror reflection largely depends on the direction from a visual point, a light tracing method is used after inter-reflection light is calculated. Since in the prior art a shadow area as a diffusion reflection component is calculated is not extracted, it is again calculated if the diffusion reflection component corresponds to a shadow area, when a mirror reflection component is calculated. However, in the present invention each area has information on a shadow with respect to each light source, so shadow determination is not required except a penumbra area.

Thus, in the calculation of picture generation, the calculation by direct light is greatly simplified because the relationship of irradiation is already known. A more detailed description of the operation of the picture generation part 23 in generating pixel data corresponding to the mesh elements generated by the mesh generation part 21 may be found in Michael F. Cohen & John R. Wallace, "Radiosity and Realistic Image Synthesis," Academic Press Professional, pp. 65–130, 1993, and Roy Hall, "Illumination and Color in Computer Generated Imagery," Springer-Verlag, herein incorporated by reference in their entirety.

The present invention is not limited to the above-described embodiment. While the constitution for carrying out the present invention has been shown in FIG. 1, for example, the present invention is not limited to this device constitution, but it may have other bus constitution or a plurality of processors. Moreover, the method of generating a shadow polyhedron, the method of generating a brightness discontinuity edge, the meshing method, and the method of generating a picture may be replaced with other methods in which the irradiation relationship can be calculated at high speed.

As described above, the mesh generation for the radiosity method could be made efficient and the speed of the rendering of the radiosity method could be increased, by calculating and storing the irradiation state of each light source for areas formed by brightness discontinuity edges. In addition, the amount of data could be made appropriate by making the mesh generation efficient.

Other embodiments of the invention will be apparent to those skilled in the art from consideration of the specification and practice of the invention disclosed herein. It is intended that the specification and examples be considered as examples only, with the true scope of the invention being indicated by the claims.

We claim:

1. In a three-dimensional computer graphic system with a display device, a method for drawing shadow images onto a light-receiving surface by occluding light emitted from at least one light source with at least one occluding surface, comprising the steps of:
   (a) generating data representative of brightness discontinuity edges for partitioning said light-receiving surface into a first region in which said light source is completely occluded by said occluding surface, and generating data representative of brightness discontinuity edges for partitioning said light-receiving surface into a second region in which said light source is at least partially irradiated;
   (b) dividing said light-receiving surface into said first region, said second region, and a third region by using said discontinuity edges, and storing data defining each of said first region, said second region and said third region as loop data;
   (c) determining and storing an irradiation state for each of said first region, said second region and said third region with respect to each said light source; and
   (d) meshing each of said regions according to its irradiation state, and calculating a brightness value of each one of a plurality of elements generated by said meshing by referring to said irradiation state of said region to which each of said elements belong, and generating pixel data according to the brightness values.

2. The method of claim 1, wherein step (a) further comprises the steps of:
   (i) generating data representative of a first shadow polyhedron that defines an umbra space in which said light source is completely occluded by said occluding surface;
   (ii) generating data representative of a second shadow polyhedron that defines a penumbra space on which said light source is at least partially irradiated; and
   (iii) generating data representative of brightness discontinuity edges within said light-receiving surface utilizing said data representative of first and second shadow polyhedrons.

3. The method of claim 1, wherein said loop data is generated in step (b) by traversing adjacent line segments which define said discontinuity edges in a characteristic direction.

4. The method of claim 3, wherein said characteristic direction is one of a clockwise direction and a counter-clockwise direction.

5. The method of claim 3, further comprising the step of setting a flag associated with each line segment to a value indicative of said characteristic direction.

6. The method of claim 1, wherein said irradiation state represents one of an umbra space, a penumbra space and irradiated space.

7. In a three-dimensional computer graphic system with a display device, an apparatus for drawing shadow images onto a light-receiving surface by occluding light emitted from at least one light source with at least one occluding surface, the apparatus comprising:
   for each light source, means for generating data representative of brightness discontinuity edges for partitioning said light-receiving surface into a first region in which said light source is completely occluded by said occluding surface, and means for generating data representative of brightness discontinuity edges for partitioning said light-receiving surface into a second region in which said light source is at least partially irradiated;
   means for dividing said light-receiving surface into said first region, said second region, and a third region by using said discontinuity edges, and storing data defining each of said first region, said second region, and said third region as loop data;
   means for determining and storing an irradiation state for each of said first region, said second region, and said third region with respect to each said light source;
   means for meshing each of said regions according to its irradiation state, and means for calculating a brightness value of each one of a plurality of elements generated by said meshing by referring to said irradiation state of said region to which each of said elements belong, and means for generating pixel data according to the brightness values.

8. The apparatus of claim 7, further comprising:
   means for generating data representative of a first shadow polyhedron that defines an umbra space in which said light source is completely occluded by said occluding surface;
   means for generating data representative of a second shadow polyhedron that defines a penumbra space on which said light source is at least partially irradiated; and
   means for generating data representative of brightness discontinuity edges within said light-receiving surface utilizing said data representative of first and second shadow polyhedrons.

9. The apparatus of claim 8, wherein said loop data is generated by traversing adjacent line segments which define said discontinuity edges in a characteristic direction.

10. The apparatus of claim 9, wherein said characteristic direction is one of a clockwise direction and a counter-clockwise direction.

11. The apparatus of claim 9, further comprising means for setting a flag associated with each line segment to a value indicative of said characteristic direction.

12. The apparatus of claim 7, wherein said irradiation state represents one of an umbra space, a penumbra space and irradiated space.

13. A method for drawing shadow images onto at least one light-receiving surface in a three-dimensional computer graphic system with a display device, the method for each light-receiving surface comprising the steps of:
   (a) defining at least one irradiating light source and at least one light source occluding surface;
   (b) selecting an irradiating light source and a light source occluding surface;

(c) generating boundary edges comprised of brightness discontinuity edges for partitioning the light-receiving surface into a first region, a second region, and a third region, wherein in the first region the selected irradiating light source is completely occluded by the selected light source occluding surface, in the second region the selected irradiating light source is at least partially occluded by the selected light source occluding surface, and in the third region the selected irradiating light source is not occluded by the selected light source occluding surface;

(d) dividing the light-receiving surface into the first region, the second region, and the third region by using the boundary edges;

(e) traversing each region along adjacent boundary edges to define at least one loop within each region;

(f) storing data representing each of the loops as loop data;

(g) determining and storing an irradiation state for each of the loops with respect to each of the regions, the selected irradiating light source, and the selected light occluding surface;

(h) meshing each of the regions by generating a plurality of mesh elements within each loop according to the irradiation state associated with the loop;

(i) calculating a brightness value of each one of the mesh elements by referring to the irradiation state of the loop; and (j) generating pixel data for display according to the calculated brightness values.

14. A method according to claim 13, wherein the number of mesh elements generated by the meshing is adjusted based upon a predetermined irradiation value.

15. A method according to claim 13, wherein classes of meshing are defined to enable a selectable degree of continuity across brightness discontinuity edges.

* * * * *